United States Patent [19]

Deroubaix et al.

[11] Patent Number: 4,470,949
[45] Date of Patent: Sep. 11, 1984

[54] METHOD OF CONTROL OF A NUCLEAR REACTOR BY MOVEMENT WITHIN THE CORE OF THIS REACTOR, OF GROUPS OF CONTROL RODS

[75] Inventors: Pierre Deroubaix, Paris; Jean-Paul Millot, Elancourt, both of France

[73] Assignee: Framatome, Courbevoie, France

[21] Appl. No.: 311,731

[22] Filed: Oct. 15, 1981

[30] Foreign Application Priority Data

Nov. 3, 1980 [FR] France ................ 80 23452

[51] Int. Cl.³ .............................................. G21C 7/00
[52] U.S. Cl. .................................... 376/217; 376/237; 376/238
[58] Field of Search ............... 376/237, 238, 217, 328, 376/218

[56] References Cited

U.S. PATENT DOCUMENTS

| | | | |
|---|---|---|---|
| 3,385,758 | 5/1968 | Gyorey et al. | 376/237 |
| 3,391,058 | 7/1968 | Gilbert | 376/238 |
| 3,979,255 | 9/1976 | Bulgier et al. | 376/217 |
| 4,016,034 | 4/1977 | Musick | 376/217 |
| 4,046,625 | 9/1977 | Musick et al. | 376/217 |
| 4,055,463 | 10/1977 | Torres | 376/217 |
| 4,129,475 | 12/1978 | Spurgin et al. | 376/238 |
| 4,169,760 | 10/1979 | Bevilacqua | 376/237 |
| 4,222,822 | 9/1980 | Mueller et al. | 376/218 |

FOREIGN PATENT DOCUMENTS

| | | | |
|---|---|---|---|
| 760096 | 5/1971 | Belgium | 376/237 |
| 2446247 | 4/1976 | Fed. Rep. of Germany | 376/237 |
| 1284871 | 8/1972 | United Kingdom | 376/237 |

Primary Examiner—Sal Cangialosi
Attorney, Agent, or Firm—Pollock, Vande Sande & Priddy

[57] ABSTRACT

When the control parameter ($\Delta T$) is within its deadband, a correction of the axial deviation of power (DA) is effected by movement of at least one group of control rods, when DA is outside a predetermined range or deadband straddling a reference value DA ref. The group which is moved is chosen as a function of the sign of $\Delta T$, of the position of $\Delta T$ with respect to its deadband and of the position of the other groups. When $\Delta T$ is outside its deadband, the differences between the amplitudes of insertion of the groups participating in the control of the reactor are made to vary by stopping or starting of groups selected as a function of the positions of the groups of rods (G1, G2, N1, N2) in the core of the reactor and of the position of DA either with respect to its deadband if DA is outside this deadband, or with respect to DA ref, if DA is within this deadband.

The invention is in particular applicable to pressurized-water nuclear reactors.

6 Claims, 5 Drawing Figures

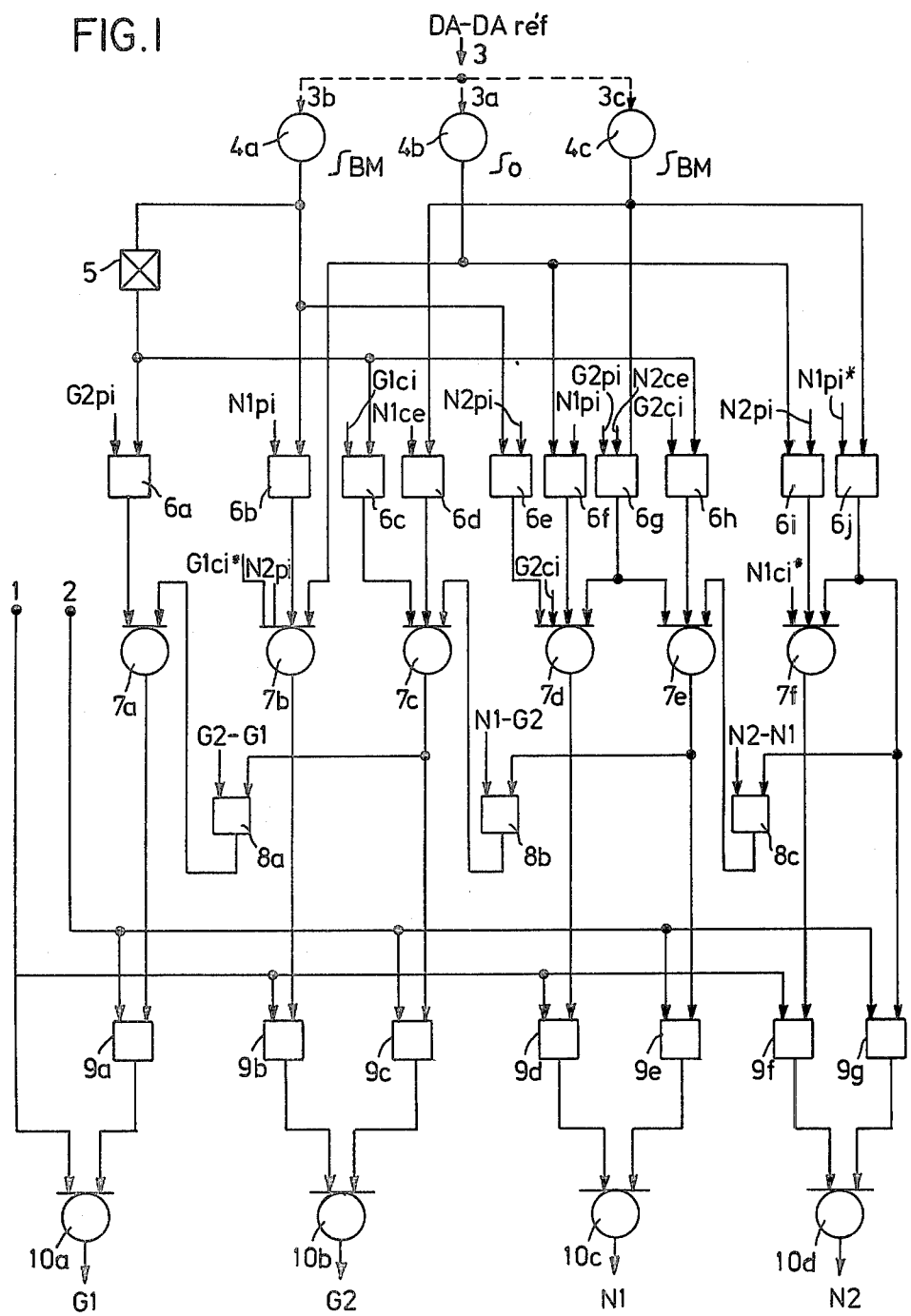

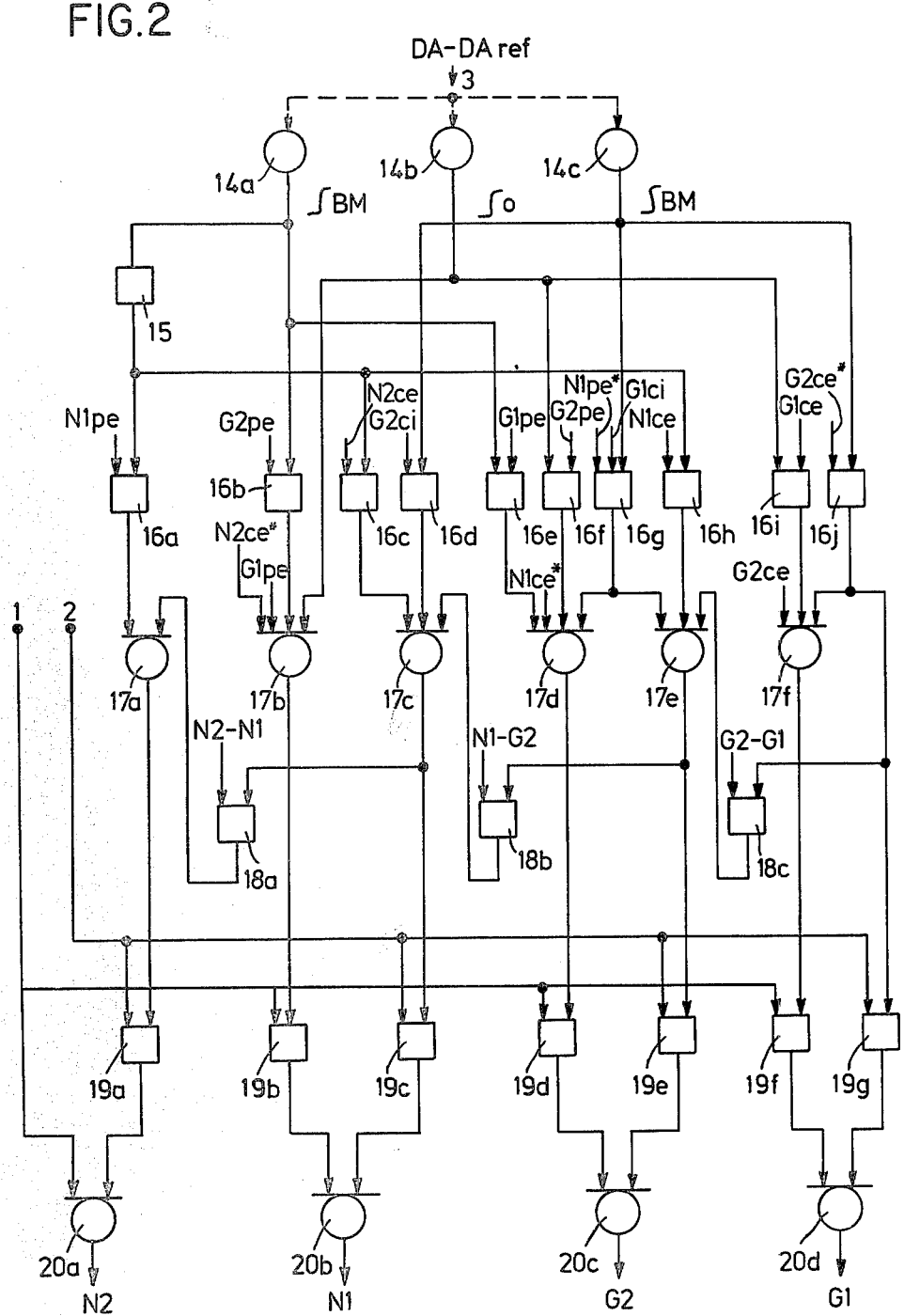

METHOD OF CONTROL OF A NUCLEAR REACTOR BY MOVEMENT WITHIN THE CORE OF THIS REACTOR, OF GROUPS OF CONTROL RODS

FIELD OF THE INVENTION

The invention refers to a method of control of a nuclear reactor by movement within the core of this reactor, of groups of control rods.

BACKGROUND

In nuclear reactors such as nuclear reactors cooled by water under pressure, it is necessary to vary the power supplied by the reactor as a function of the program of use of this reactor with which is associated a turbine enabling the driving of a turbo-alternator for the production of electric current.

Such variations in the power supplied by the reactor are obtained by variations in reactivity in the core of the reactor, i.e., in the zone in which the fuel assemblies are arranged.

In order to vary the reactivity of a pressurized-water nuclear reactor one employs firstly groups of control rods of material which absorbs the neutrons and which can be inserted between the fuel elements in the core of the reactor more or less completely, and secondly means enabling the concentration of soluble boron to be made to vary in the cooling liquid, i.e., the pressurized water.

In order to vary the concentration of soluble boron vary in the water under pressure, one introduces into this water either boric acid or pure water. The more or less strong concentration of boron in the water under pressure appears as a more or less high absorption of the neutrons by the boron in solution.

In pressurized-water nuclear reactors the fuel assemblies consist of bundles of tubular fuel elements containing the fuel material, each assembly forming an element of very great length with respect to its cross-section.

These assemblies are arranged side by side in the core of the reactor in a vertical position.

The control rods consist of tubular elements of the same length as the fuel elements and containing a material which absorbs the neutrons. These tubular elements are connected together so as to form a cluster which is movable as a whole in the vertical direction inside certain of the assemblies forming the core of the reactor. These clusters or control rods do not, however, move independently of one another; on the contrary they form groups within which the whole of the control rods move in the same way.

These groups of control rods being inserted into the core of the reactor from its upper part, a downward movement of a group consequently has a tendency to reduce the reactivity of the core of the reactor, whereas an upward movement of a group has a tendency to increase this reactivity.

A method of control of a pressurized-water nuclear reactor is known in which the groups of control rods are moved as much in one direction as in the other, according to a predetermined sequence. The movements of insertion or withdrawal of each of the groups of control rods employed in the reactor are therefore determined as a function of the movements of insertion or withdrawal of the other groups of control rods which precede them in a predetermined sequence.

In this method of control the control rods are moved only if a control parameter representative of a difference between the power demanded at the turbine and the real power from the core lies outside a predetermined range, called the deadband, straddling the value 0. On the other hand, the speed and the direction of movement of the groups of control rods are determined solely as a function of the value and of the sign of the control parameter.

This control parameter of the reactor is generally homogeneous at one temperature and is calculated by difference between the temperature of the core and a reference temperature which is a function only of the power demanded at the turbine.

In this way the power supplied by the reactor, which is a function of the temperature of the core, may be adapted to the power demanded at the turbine.

However, variations in power being obtained by a variable insertion of the control rods along the height of the core of the reactor, the distribution of the neutron flux along the height of the core, or the axial distribution, becomes disturbed. The same applies to the axial distribution of power which is similar to the distribution of neutron flux.

Hence the control of the nuclear reactor by insertion of control rods may cause the appearance of axial distributions of power which are extremely remote from an ideal distribution which is that, i.e., observed in the core when the control rods are inserted only a little way into the core.

Hence this distribution of power may develop towards a very unfavorable state which causes the appearance of hot points in the core of the reactor which may even terminate in local destruction of the fuel elements.

In order to avoid this unfavorable development of the axial distribution of power in the reactor core, it is therefore necessary to have recourse to a means of control of the reactivity in the core which is different from the control rods. Hence, when the axial distribution of power develops towards an undesirable distribution, a variation is caused in the concentration of soluble boron in the water under pressure until the time at which the level of power desired may be obtained solely by the action of the soluble boron. The control rods are then returned into a position enabling a satisfactory axial distribution of power to be obtained.

On the other hand, the disturbances of the axial distribution of power are again aggravated at the time of variations in power of the reactor by phenomena such as the formation or the disappearance of xenon by nuclear reaction. In order to compensate these effects, which further increase the unbalance in the distribution of power, one likewise possesses as the means of action only soluble boron.

This presents disadvantages because the action of the soluble boron is not instantaneous and the putting to work of this means of regulation must be effected manually.

Hence this method is difficult to employ in the case where it is required to modify the power of the reactor rapidly.

In addition, a circuit must be provided which enables either the introduction of boric acid or the introduction of water rapidly and in perfectly proportioned amounts into the reactor cooling fluid.

SUMMARY OF THE INVENTION

Hence the aim of the invention is to propose a method of control of a nuclear reactor by movement, within this reactor, of groups of control rods when a control parameter representative of a difference between the power demanded at the turbine and the real power from the core is outside a predetermined range of deadband straddling the value zero, the speed and the direction of movement of the groups of rods being determined solely as a function of the value and of the sign of the control parameter, this method of control having to enable the employment of soluble boron to be avoided for regulating the axial distribution of power in the core of the reactor, in particular at the time of rapid variations in power of this reactor.

With this aim, when the control parameter is within its deadband, a regulation of the distribution of the power released by this core is effected along the direction axial to the core by movement of at least one group of rods at a speed and in a direction of movement determined solely as a function of the value and of the sign of the control parameter, when a second parameter representative of the axial distribution of power, called the axial deviation, is outside a predetermined range or deadband straddling a reference value of the axial deviation, the group moved being determined as a function of the position of the other groups in the core of the reactor, of the sign of the control parameter and of the position of the axial deviation with respect to its deadband. When the control parameter is outside its deadband, the differences between the amplitudes of insertion of the groups participating in the control of the reactor are made to vary by stopping or starting selected groups as a function of the position of the groups in the core of the reactor and of the position of the axial deviation either with respect to its deadband, if this axial deviation is outsided this deadband, or with respect to its reference value if the axial deviation is within its deadband.

In order that the invention may be thoroughly understood there will now be described by way of non-restrictive example, with reference to the attached drawings, an example of putting the method to work for a nuclear reactor including four groups of control rods, in the case of a variation in load upon the reactor from 100% to 15% of the nominal power with a return to this power.

BRIEF DESCRIPTION OF THE DRAWINGS

FIG. 1 represents a logical diagram of control of insertion of four groups of control rods in the reactor.

FIG. 2 represents a logical diagram of the withdrawal controls of the four groups of control rods in the reactor.

DETAILED DESCRIPTION

Figure 5:
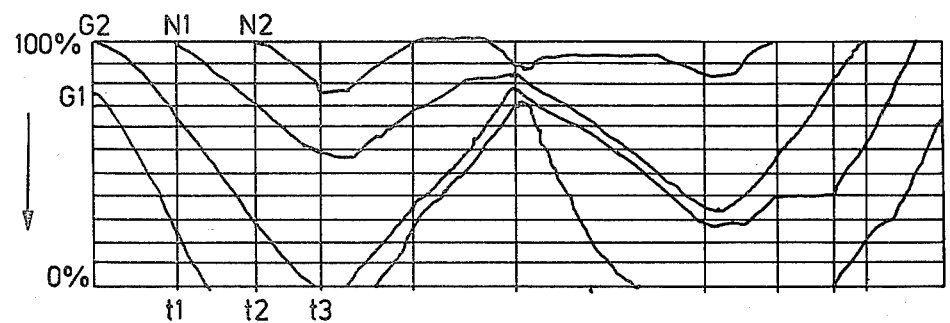
FIG. 5 represents the positions of the four groups of control rods during the load cycle.

The logical diagrams represented in FIGS. 1 and 2 give a symbolic representation of the signal and operators necessary for the control of four groups of control rods G1, G2, N1 and N2 employed in a pressurized-water nuclear reactor.

These groups G1 to N2 consist of clusters of absorbent elements which are moved simultaneously in the vertical direction inside the core of the nuclear reactor.

Within the groups of control rods G1 and G2, certain of them are lightened in antireactivity, that is to say, certain absorbent elements in the cluster are replaced by elements transparent to neutrons.

Each of these groups G1 and G2 is a group which is designated by a grey group as opposed to the black groups N1 and N2 which are formed of clusters which comprise only strongly absorbent elements.

The antireactivity of a grey group which is measured in pcm (per hundred thousand) is therefore distinctly lower than the antireactivity of a black group. Thus the grey groups have an antireactivity less than 700 pcm, whereas the black groups have an antireactivity higher than 1000 pcm.

The grey groups produce a less strong disturbance of the axial distribution of power than the black groups.

It may be seen in FIGS. 1 and 2 that with the exception of three signals 1,2,3 the whole of the signals employed for the control of the groups G1, G2, N1, N2 are representative of the positions of the groups of control rods in the reactor core.

The control parameter of the reactor as in the method in accordance with the prior art is representative of a difference between the power demanded at the turbine and the real power.

This control parameter is homogeneous at one temperature and represents the difference $\Delta T$ between a reference temperature and the temperature of the core of the reactor.

A signal representative of the value of this parameter is worked out, starting from signals representative of the temperature of the core, of a reference temperature and of the power demanded at the turbine, and then compared with two limiting values representing the boundaries of a range, centered about the value zero.

When $\Delta T$ is situated outside this range, the signal 1 is emitted either in the form of the signal "Insertion 1" if $\Delta T$ is outside the range on the side of the positive values, or in the form of the signal "Withdrawal 1" if $\Delta T$ is outside the range on the side of the negative values.

If $\Delta T$ is situated within the range straddling the value zero, called the deadband of the temperature, no signal 1 is emitted.

Hence an action upon the control rods by the signal 1 is ordered only in the case where a difference in temperature is recorded which shows a difference of sufficient amplitude between the power demanded at the turbine and the real power of the reactor. This is identical with what used to be done in the methods of the prior art.

On the other hand, in every case a signal 2 is emitted either as a signal "Withdrawal 2" when $\Delta T$ is less than zero, or as a signal "Insertion 2" when $\Delta T$ is greater than zero.

Likewise, in every case from the signal $\Delta T$ a speed signal is generated for the movement of the control rods.

Hence the signal $\Delta T$ depending upon its sign and its value determines a speed and a direction of movement of the control rods.

A signal is likewise worked out which is representative of a second parameter intended to take into account the axial distribution of power in the core.

This parameter is called the axial deviation of power (or of flux) and is equal to:

$$\frac{\phi H - \phi B}{\phi H + \phi B},$$

if by ØH is designated the neutron flux in the upper half of the core and by ØB the neutron flux in the lower half of the core.

For this parameter of axial deviation (DA) a reference value is defined which corresponds with the axial distribution of the power in the core, when the control rods are all withdrawn from the core except for the control rods of the first group G1, which remain permanently partially inserted.

Hence the reference value of the axial deviation of power is very slightly negative.

About this reference value of the axial deviation a range or deadband is defined, the boundaries of which are DA ref−BM and DA ref+BM, designating by BM the half-width of the deadband.

The other signals represented symbolically in the FIGS. 1 and 2 and relative to the position of the groups of control rods in the core must be understood as follows:

the two grey groups G1 and G2 and the two black groups N1 and N2 have a position which is marked as far as their insertion or their withdrawal is concerned and which gives rise to the emission of a signal;

the position of each of the groups is defined with respect to certain limits and not exactly quantitatively;

the difference is likewise taken into account between the control clusters of certain groups.

Thus the significance of the signals mentioned in the diagrams 1 and 2 and corresponding with the position of the groups is the following:

| | |
|---|---|
| pi | partially inserted; |
| pi* | inserted by more than n' steps; |
| pe | partially withdrawn; |
| pe* | withdrawn by more than n' steps; |
| ce | completely withdrawn; |
| ci | completely inserted; |
| ci* | at less than n steps of total insertion; |
| ce* | at less than n steps of total withdrawal; |
| G2−G1 | difference between G1 and G2 less than n' steps. |

The logical operators of the insertion control devices are in succession for the control during insertion of the four groups G1, G2 and N1, N2: three OR operators $4a$, $4b$ and $4c$, one NOT operator 5, ten AND operators $6a$ to $6j$, six operators $7a$ to $7f$, three AND operators $8a$ to $8c$, seven AND operators $9a$ to $9g$ and finally four OR operators $10a$ to $10d$.

The withdrawal control device for the four groups includes for its part three OR operators $14a$ to $14c$, one NOT operator 15, ten AND operators $16a$ to $16j$, six OR operators $17a$ to $17f$, three AND operators $18a$ to $18c$, seven AND operators $19a$ to $19g$ and finally four OR operators $20a$ to $20d$.

We are now going to envisage, with reference to FIGS. 1 and 2, various cases which may be encountered during the control of a nuclear reactor.

The principles maintained for the control of the rods, with the aim of carrying out rapid variations of power with correction of the axial deviation of power, solely by employing the control rods, are the obtaining of the corrections of the axial deviation of power, preferably with rods which are moved either at the top of the core or at the bottom of the core, i.e., rods which are inserted only a short distance, or on the contrary are inserted most of the way, and the employment preferably of rods which are moved towards the center of the core in order to obtain the variations in power.

In short, it is well known that movements of the rods upwards or downwards in the core have a large influence upon the DA and a small influence upon the variation in power, and that rod movements towards the center of the core have a small influence upon the axial deviation and a large influence upon the variation in power.

If one assumes first of all, that in the control of a nuclear reactor both the parameter $\Delta T$ and the parameter DA are within their respective deadbands, one realises by referring to FIGS. 1 and 2 that no rod movement occurs.

In short, the signal 1 is not emitted and only the signal 2 is emitted either for insertion if $\Delta T$ is less than zero, or for withdrawal if $\Delta T$ is greater than zero.

Otherwise the axial deviation signal $3a$ is emitted to the exclusion of the signals $3b$ and $3c$.

In all of the configurations the signal $3a$ cannot trigger a signal capable of being added to a signal 2 at the level of one of the AND operators $9a$, $9c$ or $9e$ or else $19a$, $19c$, or $19e$. Hence all of the rods remain stationary.

If now $\Delta T$ is within its deadband and if DA is outside its deadband, only the signal 2 is emitted to the exclusion of the signal 1, either for insertion or for withdrawal. On the other hand, either signal $3b$ or $3c$ is emitted in order to indicate DA having left its deadband, either below this deadband or above it.

In this case, upon referring to FIGS. 1 and 2 one realises that all of the groups partially inserted and normally controlled either for insertion or for withdrawal by the signal 1 remain stationary with the exception of one of them which is moved under the effect of the signal 2 either in the insertion direction or in the withdrawal direction depending upon the sign of $\Delta T$.

If we assume that the three groups G1, G2 and N1 have already been partially inserted in this order, since the sequence of insertion of the group is (G1, G2, N1, N2) in the case in which the signal $3b$ is emitted, i.e., if DA is less than DA ref−BM, it is the group G1 which is controlled towards insertion, whereas if the signal $3c$ is emitted it is group N1 which is controlled towards insertion.

In one case it is the group situated lowest, i.e., the one which is inserted furthest and in the other case it is the group situated highest which is moved, to the exclusion of the other groups.

It would be the opposite in the case of a withdrawal.

In any case the group moved either towards insertion or towards withdrawal is moved at slow speed, the speed of movement as a function of $\Delta T$ being low within the deadband of temperature.

This speed may, for example, be fixed at eight steps per minute in the case of the control rods of a pressurized-water nuclear reactor, the total amplitude of movement of which is 200 to 300 steps.

Hence in the method in accordance with the invention one realises that, although the temperature is within its deadband, a correction of the DA is effected by movement of a group chosen as a function of the position of the other groups, of the value of the DA and of the direction of movement.

If we now assume that the temperature is outside its deadband, in any case, depending upon the sign of $\Delta T$, a certain number of groups are in movement in the core of the reactor either towards insertion or towards withdrawal.

If simultaneously the axial deviation is within its deadband and higher than the value DA ref, it may be seen, for example, in the case of an insertion of the groups G1, G2 and N1 which are already partially inserted, that the groups G1, G2 and N1 receive authorisation signals for movement towards insertion and that the movement occurs.

If the movement causes an increase in the axial deviation it may leave its deadband and we shall envisage this case later on, or on the contrary the axial deviation may diminish until it becomes less than its reference value.

If the axial deviation is less than its reference value but greater than the lower limit of the deadband of axial deviation DA ref−BM, the signal 3a becomes negative, which suppresses the authorisation signal for the group N1, with the result that this group N1 is blocked whereas the groups G1 and G2 continue their insertion.

This causes an increase in the axial deviation of power except in the case in which, in spite of everything, a supplementary phenomenon causes the axial deviation to pass outside its deadband and below it.

We shall imagine this case likewise later on.

In the case in which the axial deviation increases until it is above its reference value while remaining within its deadband, the group N1 again receives the authorisation signal and undergoes starting up towards insertion.

These successive movements of stopping and restarting of the group N1 may continue, with the result that the differences between the amplitudes of insertion of this group and of the other groups are led to be modified in order to carry out the corrections of the axial deviation.

If it is still assumed that the three groups G1, G2 and N1 are controlled towards insertion by the "Insertion 1" signal and that the axial deviation of power leaves its deadband and passes above it, one realises that the authorisation signal for insertion of the group N2 is then emitted and that this group commences to be inserted into the top of the core in order to reduce the axial deviation of power.

Still in the case of an insertion of the groups G1, G2 with the group N1 blocked at the top of the core, in the case in which the axial deviation of power leaves its deadband downwards, blocking of the group N1 is effected so that no group is involved in the top of the core, whereas the groups G1 and G2 continue to be inserted towards the bottom of the core, which reduces ØB and hence increases the axial deviation of power until the time at which it returns within its deadband. One then returns to one of the cases envisaged above.

In the case in which it is the signal "Withdrawal 1" which is emitted, if the axial deviation of power is above the upper limit of its deadband, recourse is had to the withdrawal of a group situated in the bottom of the core in order to limit the axial deviation of power.

It may be seen that, in any case, a modification is effected of the amplitudes of insertion existing between the different groups employed for the control of the reactor.

When ΔT is beyond a certain limit outside its deadband, the movements of the groups take place at higher speed than when ΔT is within its deadband.

The control of the groups is effected by no matter which of the signals 1 or 2 which act in the same direction.

Figure 3:
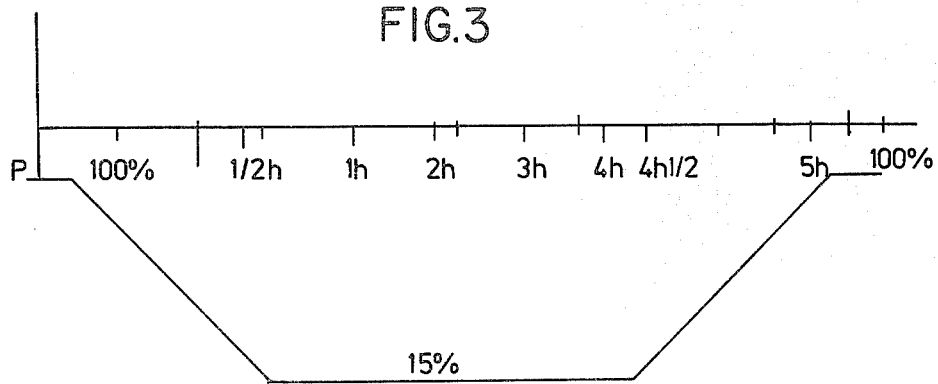
FIG. 3 represents the variation in power of the nuclear reactor during a load cycle.

An example will now be described, with reference to FIGS. 3, 4 and 5, of application of the method in accordance with the invention in the case of a load cycle for a period of some hours, the development of the power of the reactor during the course of these hours being given in FIG. 3.

One starts from the nominal power of the reactor and the power is lowered down to 15% of the nominal power in half-an-hour and then a level stretch is maintained at 15% of the nominal power for 4 hours before returning to the nominal power in half-an-hour.

Figure 4:
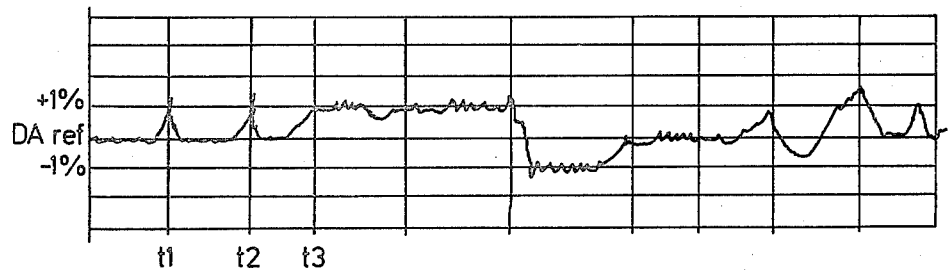
FIG. 4 represents the corresponding variation in the axial deviation during this load cycle.

FIG. 4 gives the development of the axial distribution of power during these five hours of operation, whereas FIG. 5 gives the position of the different groups of control rods G1, G2, N1 and N2 between 0 and 100% of withdrawal.

The variations in the axial deviation of power are maintained within a range of ±1% about the mean value DA ref.

At the initial instant only the group G1 is inserted a short distance into the top of the core, the groups G1, N1 and N2 being completely withdrawn.

In order to lower the power down to 15% of the nominal power, one commences to insert the groups G1 and G2 the sequence of insertion of which determines the successive insertion.

As a certain distance apart is maintained between G1 and G2 by stopping or restarting G2, their effects upon the axial deviation of power is compensated and this axial deviation oscillates slightly about its reference value.

At an instant t1 during the course of insertion of the rods, however, the axial deviation of power reaches the upper limit DA ref+1%, which brings about the setting to work of a new group N1 in the top of the core for the reduction of this axial deviation by simultaneous action of the groups G1, G2 and N1.

The same applies at the instant t2 at which the intervention of a new group N2 in the top of the core re-establishes the axial deviation of power.

It may seen that the method in accordance with the invention thus enables the axial deviation of power to be maintained within a range of amplitude ±1% about the reference axial deviation.

After the complete insertion of the group G1, the groups G2, N1 and N2 assure the lowering of power until the level stretch at 15% is reached at the instant t3.

The temperature parameter ΔT then coming within its deadband, the groups of control rods are blocked in the position of insertion until the time when raising of the groups again is carried out at constant power equal to 15% of the nominal power.

During the course of the raising of the groups again at constant power, i.e., during the course of the movement of withdrawal of these groups G1, G2, N1 and N2, the control parameter ΔT is positive, sometimes outside its deadband, sometimes within it. The axial deviation of power is controlled in both cases by the regulation of the distance apart between the several groups during the course of movement, by successive stopping and restarting of these groups.

In the same fashion during the relowering of the groups, i.e., during their insertion, after the control parameter ΔT has become negative again, it is sometimes below its deadband and sometimes within it, and the regulation of the distances apart between the several groups G1, G2, N1 and N2 by stopping and restarting of these groups enables the axial deviation of power to be maintained within its deadband.

It is likewise to be observed that the passing of the axial deviation below its reference value within the deadband of the axial deviation of power, brings about the blocking of one group which is the highest group at the time of insertion of the groups, i.e., the group N2 in the example described in FIG. 5. The restarting of this group occurs if the axial deviation of power passes above its reference value again within the deadband of the axial deviation of power.

At the end of the level stretch at 15% of the nominal power, raising of the groups again is effected, i.e., withdrawal in the order N2, N1, G2 and G1.

During this re-raising of the groups, a regulation is likewise effected of the axial deviation of power by blocking and restarting of the groups as a function of the position of the axial deviation of power with respect to its reference value and with respect to its deadband.

It may be noted that the overall re-raising of the groups during the low level stretch, however, diminishes the possibilities of the whole of the groups of control rods as far as the restoration of power is concerned.

It is however quite obvious that one may choose to preserve fully the possibility of restoration of power when one is at the low level stretch of power (15% of nominal power, in our example) by keeping a sufficient insertion of the control rods while employing the system of treatment with boric acid and dilution of the water under pressure serving as the coolant.

Thus, with the method in accordance with the invention, which enables regulation of the axial deviation of power, the employment of this device for treatment with boric acid/dilution may be employed for keeping the control rods inserted substantially as far as is necessary for a rapid recovery of power, the usefulness of which might make itself as a function of the needs of the production of power.

On the contrary, if one chooses to preserve only a partial recovery of power or not to maintain this possibility of recovery of power, the rods may be allowed to rise again under the effect of the production of xenon during the low level stretch of power.

It is in fact this production of xenon at constant power which necessitates the raising of the rods again during the first portion of the level stretch.

In view of the possibilities of regulation of the distances apart existing between the several groups of rods, the axial deviation of power is still regulated and one thus avoids having recourse to the system of treatment with boric acid and dilution of the coolant which the more reduces the retreatment of the effluents.

The method in accordance with the invention likewise enables a load cycle to be carried out at the end of the life of the fuel when the dilution becomes slow.

Hence it may be seen that the main advantages of the method in accordance with the invention are to enable regulation of the axial deviation of power independently of the employment of a device for treatment with boric acid or dilution of the coolant except at a level of power equal to the nominal power or near to this power, when the amount of xenon present in the reactor has not been stabilized.

If it is required to preserve the possibilities of recovery of power in the reactor, for example, during a phase at reduced power during the course of which the production of xenon would necessitate a raising of the rods again, the device for treatment with boric acid and dilution of the coolant may be employed for keeping the control rods at an insertion which is sufficient and even rather higher than that which would just be necessary for the recovery of power.

In any case, the method in accordance with the invention enables regulation of the axial deviation of power by stopping and restarting groups chosen out of the whole of the groups for regulation.

The method in accordance with the invention enables this regulation of the axial deviation of power to be effected both in the case of prolonged level stretches of power and in the case of rapid transients.

The method in accordance with the invention is not restricted to the embodiment which has just been described.

Thus a method of control has been described employing four groups of control rods two groups of which are grey and two are black, but it is equally possible to employ different assemblies of groups of control rods, for example, six grey groups or three grey groups and two black groups.

Nor is the invention restricted to the employment of two different temperature signals one of which is transmitted only when the temperature difference leaves its deadband and the other of which is transmitted whatever the position of the control parameter. On the contrary, one may conceive of other types of signals and even of signals representative of a control parameter differing from a parameter $\Delta T$ which is homogeneous at one temperature and represents the difference between the temperature of the core and a reference temperature.

Finally the method in accordance with the invention is applicable in every case in which a nuclear reactor may be piloted by movement within the core of this reactor of groups of control rods.

We claim:

1. A method of control of a nuclear reactor associated with a turbine, comprising the steps of
   (a) determining a control parameter representative of the difference between the power demanded by said turbine and the real power produced by the core of said reactor;
   (b) determining the position of said control parameter relative to a predetermined range, called a first deadband, straddling the value of zero;
   (c) moving groups of control rods according to a predetermined sequence in said core in a direction determined by the sign of said control parameter and at a speed proportional to the value of the latter, when said parameter is outside said first deadband;
   said method further comprising the following steps for complementary control of the motion of said groups of control rods:
   (d) determining a second parameter, called axial deviation, representative of the axial distribution of power in said core;
   (e) determining the position of said axial deviation relative to a predetermined range, called a second deadband, straddling a reference value of said axial deviation; and
   (f) when said control parameter is inside said first deadband and said axial deviation is inside said second deadband, keeping said control rods immobile;

(g) when said control parameter is inside said first deadband and said axial deviation is outside said second deadband,
  (i) selecting a group of control rods as a function of the sign of said control parameter and of the position of the axial deviation with respect to said second deadband; and
  (ii) moving said selected group in a direction determined by the sign of said control parameter and at a low speed corresponding to the value of the control parameter in said first deadband;
(h) when said control parameter is outside said first deadband and said axial deviation is inside said second deadband, moving groups of control rods according to said predetermined sequence and according to the position of said axial deviation with respect to its reference value;
(i) when said control parameter is outside said first deadband, said control rods being moved, and when said axial deviation is outside said second deadband,
  (i) selecting at least one group of controlled rods to be stopped or started in order to cause the axial deviation to return to within said second deadband, as a function of the position of said groups in said core and of the position of the axial deviation with respect to said second deadband; and
  (ii) acting on said selected group as determined.

2. A method of control according to claim 1, comprising the steps of calculating a signal which is representative of the reactor control parameter, comparing said signal with the value zero in order to determine its sign, emitting two different signals of insertion or of withdrawal of said control rods according to the sign of said control parameter if this parameter is outside its deadband and only one signal of insertion or of withdrawal of the control rods if this parameter is within its deadband, these signals as well as signals representative of the axial deviation of power and of the position of the groups of control rods being introduced into a logical processing unit which determines signals for authorization or prohibition of the movements of the several groups of said control rods.

3. A method of control according to claim 1, including the use, concurrently with the groups of control rods, of a system for controlling the content of soluble boron in a cooling medium in contact with the fuel elements in the core of the nuclear reactor.

4. A method of control according to claim 3, wherein, when the power of the reactor is less than the nominal power, the groups of control rods are kept in a position of insertion substantially equal to that which would be just necessary for obtaining the return to full power solely from the control rods, while employing the system of modification of the content of soluble boron, whereby to facilitate rapid return of said reactor to power.

5. A method of control according to any one of claims 1 to 4, wherein at least one of the groups of control rods is lightened in antireactivity, this antireactivity being less than 700 pcm.

6. A method of control according to claim 5, making use of two groups lightened in antireactivity, or grey groups, and two strongly absorbent groups, or black groups.

* * * * *